United States Patent [19]

Schanze

[11] Patent Number: 4,504,516

[45] Date of Patent: Mar. 12, 1985

[54] METHOD FOR THE PREPARATION OF POWDERIZED HONEY PRODUCTS, THE PRODUCTS OBTAINED ACCORDING TO THE METHOD AND THEIR USE

[76] Inventor: Rudolf Schanze, Neumarkt, Fed. Rep. of Germany

[21] Appl. No.: 464,909

[22] Filed: Feb. 8, 1983

[30] Foreign Application Priority Data

Feb. 9, 1982 [DE] Fed. Rep. of Germany ....... 3204367

[51] Int. Cl.³ .............................................. A23L 1/08
[52] U.S. Cl. ..................................... 426/658; 426/96; 426/97; 426/443
[58] Field of Search ..................... 426/658, 443, 96, 97

[56] References Cited

U.S. PATENT DOCUMENTS

| | | | |
|---|---|---|---|
| 2,621,128 | 12/1952 | Webb et al. | 426/658 |
| 2,693,420 | 11/1954 | Straub | 426/658 |
| 3,505,080 | 4/1970 | Cullen | 426/97 |
| 3,879,567 | 4/1975 | Verner | 426/658 |
| 3,941,893 | 3/1976 | Glabe et al. | 426/658 |

FOREIGN PATENT DOCUMENTS

| | | | |
|---|---|---|---|
| 0055381 | 7/1982 | European Pat. Off. | 426/658 |
| 5820583 | 7/1977 | Japan | 426/658 |
| 2076003 | 11/1981 | United Kingdom | 426/658 |

OTHER PUBLICATIONS

Turkot et al., A Continuous Process for Dehydrating Honey Manufacturing Conf., 9-1960, vol. 14, No. 8, pp. 38-40.

*Primary Examiner*—Jeanette M. Hunter
*Attorney, Agent, or Firm*—Ostrolenk, Faber, Gerb & Soffen

[57] ABSTRACT

A powdered honey product containing 50-85% of honey or a mixture of honey and at least one bee product selected from the group consisting of beebread, pollen royal jelly, drone syrup, green syrup, beeswax, propolis and propolis extract, 5-25% silica and 25-35% polymeric carbohydrate.

24 Claims, No Drawings

METHOD FOR THE PREPARATION OF POWDERIZED HONEY PRODUCTS, THE PRODUCTS OBTAINED ACCORDING TO THE METHOD AND THEIR USE

DESCRIPTION

The present invention relates to a method for preparing powdered honey products, to the products obtained by the method and to the use of the powdered bee products.

In general, bee products, in particular honey, also drone syrup and queen bee syrup, propolis, propolis extracts (bee glue), which are dissolved in the honey as well as pollen and beebread, which are also distributed in the honey, are extremely viscid-plastic, heavy-flowing viscous materials. In addition to their food value, which can be different depending on the product but which however is always very high, these products are endowed with additional health-promoting, sickness preventing, and in short biological properties. These properties are based on materials contained in the bee products, which in part already derive from the plant food of the bees, however which in the larger part are generated by the working and processing through the bees, and which are enriched in the bee products and which provide these biological properties. (Compare for example Edmund Herold "Health values from the bee colony", 6th edition, 1970, Publisher: Ehrenwirth-Verlag, Munich).

The varied and beneficial effects of these materials are known overall. However, the composition of these materials is still not finally known, and some of the materials have not been identified. However, it is established that these materials are extremely sensitive, in particular to heating. Therefore, bee products are in general stored at temperatures in the range of from $-15$ to $+13$ degrees centigrade. In the case of honey, it is provided that any crystallization is prevented, since crystallization favors fermentation and thus leads to spoilage. The particular effects of the bee products are in part ascribed to hormone, to enzyme and to vitamin-like groups of active agents, in part to complex mineral trace element groups, of which it is also known that they can be increasingly sensitive to a heating beyond the range of from 35 to 40 degrees centigrade.

This complex grouping of active ingredients of the bee products requires particular attention, in particular in order to retain the grouping unchanged until its use and during the prior provided processing for human consumption. The particular technical difficulty in this regard is the generally plastic, viscous, water-containing consistency of the bee products.

However, it is necessary to render these materials and mixtures technically manageable for a processing set out to provide foods for human consumption. Such methods of processing employ mechanical and physical processing, in particular water removal, which, in general based on the heat input, and results in a more or less severe loading and denaturization. The bee products are thereby disadvantageously influenced and become deprived of their special property, the so-called "vital force". The degradation starts at temperatures in the range of from 35 to 40 degrees centigrade and becomes stronger, the higher the temperature and the longer the time during which the product is kept at the increased temperature.

The increased temperature creates additional hygienic problems. A reattachment of germs can easily occur at increased temperature, and the development of the germs is fostered by the increased temperature. A heating is always disadvantageous in the industrial processing as is an extended treatment time, since increased costs are thereby incurred, and these are to be minimized as far as possible based on economic reasons.

Various methods are known for the production of solid materials containing honey.

For example in the German Democratic Republic Pat. No. 7968, the German Pat. Nos. 848,488 and 879,007 as well as U.S. Pat. No. 2,621,128, methods are described for the production of powderized honey products. All these known methods are associated with the disadvantage that the honey product has to be heated to an increased temperature for extended times. A method for the production of powdered honey products is described in the German Patent Application Laid Open DE-OS No. 2,919,059, which is advantageous relative to the methods described in the above recited patent literature. The method described in the DE-OS No. 2,919,059 provides for mixing honey with buttermilk powder.

The DE-OS No. 2,919,059 discloses that even in case of small amounts of products a mixing for 10 to 30 minutes has to be provided in order to work in the honey in small amounts. Thereupon a settling storage is provided, which amounts to at least 10 minutes (Example 5), however, which in general is between 24 and 48 hours (Example 1 and others). After the intermediate storage, the final comminution process is provided, which again takes 15 to 20 minutes. Only then the products are finished in their manufacturing steps. In total, mixing times of from 25 to 50 minutes and storage times of usually from 1 to 2 days are provided. This, for practical purposes, excludes an industrial production, if one understands under industrial production that the industrial process steps are hygienic without risks and that in addition they are to be very economical with respect to space, time and equipment expenditure.

A method for the production of a honey milk dry product is described in the German Patent Application Laid Open DE-OS No. 1,692,782 where a mixture of honey, a dry milk product and water are mixed and the mixture is dried. Also fresh milk products such as full cream milk, skim milk, buttermilk and whey can be employed instead of the dry milk product and the water. A product is obtained according to this known method, which is a powder and which comprises from 10 to 75 parts honey solids for about 90 to 25 parts of milk solids. It is essential in this method that the water content before the drying is above 90 percent. According to most of the examples, the drying is provided by freeze drying. However, it is stated that other drying processes can also be employed. It is a disadvantage of this method that large quantities of energy are required for the transformation of the honey into a powder product, since solutions with a water content of more than 90 percent are to be evaporated and to be dried. Therefore, this method is technically disadvantageous. The freeze drying is further associated with large equipment requirements, and therefore this method is unsuitable for the large scale technical production of powdered honey products.

A method for the production of honey products is described in the German Patent Application Laid Out DE-AS No. 1,003,4560 where a solution of gelatinated starch is mixed with honey, the mixture is allowed to stand at temperatures up to about 45 degrees centigrade for the degradation of the starch and is cooled after the addition of citric acid and is the concentrated in vacuum. According to a special embodiment, milk or milk powder is added to the product of honey and starch. The product obtained according to this method is associated with the disadvantage that its shelf storage life is limited.

It can be gathered from the above patent disclosures that in all methods considerable problems are encountered. Baking and lumping occur upon addition of honey, and in order to eliminate the lumps considerable time and equipment expenditures are required. It is a further disadvantage of the known methods that the products obtained with the known methods contain only small amounts of honey. Thus the product obtained according to the DE-OS No. 2,919,059 contains between 25 and maximum 37.5 percent honey.

A powdered honey product is commercially available, which is exported from the United States, and which is produced by freeze drying of a material containing honey. The commercially available product contains about 30 percent honey. The biological activity of the honey part remains effective during the freeze drying process. However, the product cannot be produced with a larger contents of honey. Based on the expensive production method, the product is very expensive and is available only in limited amounts.

It is an object of the present invention to provide a powdered bee product which contains at least a honey content of 50 percent by weight or more, as referred to the final product. The powdered bee product is to be produced easily on an industrial scale in a simple way and without large time requirements. The equipment needed for the production of the honey product is to be limited to simple apparatus and the standardization of the product obtained is to be rapid and simple. The technical procedure is to be such that the biological activity of the honey or, respectively, of the bee products remains undisturbed. Therefore, the subject matter of the invention is a method for the production of powdered honey products, which contain at least 50 percent by weight honey, which is characterized in that at least 15 to 25 percent by weight pyrogenic or precipitated fine particle silica, as referred to the final product, are placed into a mixer, the silica is agitated and 85 to 75 percent by weight of honey or of a mixture of honey and one or more bee products, as referred to the final product are added continuously or in portions such that a temperature of 35 degrees centigrade is not exceeded.

The invention further relates to a method for the production of powdered honey products containing at least 50 percent by weight honey, which method is characterized by mixing 5 to 15 percent by weight pyrogenic or precipitated fine particle silica and 25 to 35 percent by weight polymeric carbohydrates in a mixer and by adding continuously or in portions 50 to 70 percent by weight of honey or of a mixture of honey and one or more other bee products to a moving mixture of silica and carbohydrates, where the weight percentages are referred to the final product such that a temperature of 35 degrees centigrade is not exceeded.

Also the invention relates to a method for the production of powdered honey products, which contain at least about 50 percent by weight of honey, which is characterized in that 5 to 15 percent by weight of pyrogenic or precipitated fine grained silica and 25 to 35 percent by weight of polymeric carbohydrates and 50 to 70 percent by weight of honey or of a mixture of honey and one or more other bee products are mixed with each other, where the percentages by weight refer to the amount of final product and (a) a mixture is produced from the polymeric carbohydrates and from the honey or the mixture of honey and one or more other bee products, which mixture contains 45 to 55 percent by weight of honey or a mixture of honey and one or more other bee products and 45 to 55 percent by weight of polymeric carbohydrates, as referred to the weight of honey and polymeric carbohydrates, (b) silica is added to the mixture of polymeric carbohydrates and honey, mixing is provided, (c) the remaining honey or the remaining mixture of honey and one or more other bee products are continuously or in portions added to the moving mixture of honey, polymeric carbohydrates and silica in such a manner that a temperature of 35 degrees centigrade is not exceeded.

In the following description the term "honey" is intended to comprise also a mixture of honey and one or more bee products.

The invention further relates to the products obtained according to the method as well as the use of the powdered bee product as a preproduct for the production of food, as a carrier material for pharmaceutical products or as a food material or as an animal feed material.

The method starts with placing honey into a suitable carrier material for the powder production. Fine powdered silica is employed for this purpose. Such silica is for example commercially available under the trademark Aerosil and can be purchased from Degussa.

It is described that such pyrogenic or precipitated silica is adapted to transfer Ethoxyquin, choline chloride, vitamin E as alpha-tocopherol-acetate, molasses and lecithin from the liquid state to the powder form by absorption of the moisture or of the oil. Up to 66 percent parts are reached with Ethoxyquin, up to 65 percent parts are reached with tocopherol-acetate and up to 75 percent parts are reached with lecithin and molasses and the remainder in each case is from 25 to 35 percent of such silica. It is noted, however, that in practical cases, for example with the tocopherol-acetate, only a value of 50 percent is realized, which is much below the highest indicated laboratory quantities. (Compare for example Degussa, Frankfurt, Fed. Rep. of Germany, Schriftenreihe Pigments, No. 11, "Basics" 1967, No. 23 "Aerosil as thickening agent in liquids", No. 30 "Synthetic silica, a modern auxiliary material in the animal feed industry", No. 50 "Synthetic silica as an auxiliary material in the animal feed industry".)

The analogously performed experiments with honey confirm those results, even if honey is made very thin flowing by heating to 40 degrees centigrade. In the range of 50 to 75 percent honey parts spontaneous lumps are generated, which do not dissolve again.

Surprisingly it was found however, that the portion of honey in the powdered honey product can be substantially increased if the silica is placed first into the mixing vessel and if then under agitation the honey is added to the silica without taking notice of occurring lumps. If one adds the honey, which contains other bee products, to the silica provided, then surprisingly it is possible to produce without difficulty, powdered products which contain 75 percent by weight. Upon appropriate performance of the method, products with 80 percent by weight and even 85 percent by weight of honey can be produced. This means, surprisingly, that just 25 to 15 percent by weight of silica as referred to the final product is sufficient for producing powdered honey products.

The production of the presently known powdered liquids such as ethoxyquin, tocopherol-acetate, molasses and the like occurs in mixing plants as they are usually employed in dry mixing, possibly with additional provisions for the addition of small amounts of liquid. Here the process has to be run from the beginning so that lump formation and baking together are avoided, since the lumps so formed cannot be dissolved again.

However, in accordance with the invention, types of mixers are employed which are usually used for the emulsifying of materials or for the dispersion of liquids. This means that usually the final products leave these mixers in a liquid in a more or less thick flowing state, that is they flow out of the vessel.

However, such apparatus is particularly adapted to the invention method, that is, not for mixing liquid materials with each other or solid materials in liquid materials, but on the contrary for mixing the dry silica with a heavy flowing honey such that finally a solid and pourable powder leaves the mixing apparatus as the final product.

However, these apparatus have a disadvantage which comprises that in usual service the mixing resistance is low and the the power of the motor is correspondingly weak. The short time overload capacity of the motors is sufficient for the experiments in individual batch charges to realize the mixing process. Then the overloaded and overheated motor can cool down again. However, for the special operation it can be provided that the motor power is tuned to the different type of new work operation, therefore a stronger motor is to be furnished.

A further type of apparatus was tried and found to be good. Mills are employed for the comminution of solid materials and hammer mills take a relative dominant position for example in the area of animal feeds. Such mills comprise in their working area a shaft on which movable beaters, the hammers, are disposed. By motor power, these beaters are moved in a circle such that they extend radially based on the tangential force, accept the material running in and place it in rapid motion. The material thus rapidly moved and brought in a circulating motion by the milling space is thrown against opposing surfaces, which are impact surfaces, whereby it comminutes. Depending on the sieve disposed at the run out, the sufficiently comminuted material leaves the milling space with the beaters and the impact surfaces. The remaining material remains in the milling stage until it can also exit via the sieve. A high torsioning and comminuting force occurs.

Surprisingly, even such an apparatus can be employed. The silica to be filled in or the carbohydrates or the mixtures of silica or of carbohydrates is fed in via a feed hopper of the mill, even though they are already sufficiently fine. At the same time however the honey or the honey mixture also is fed in via pipes. The mill dissolves the occurring lumps and agglomerates, the initially not completely appropriately proportioned honey poor material is caught at the output and is fed back again to the feed hopper via conveying devices known in principle, such as worms, bands or the like, and the process is repeated until the required amount honey/honey mixture is mixed with the carrier. By feeding and feedback, the temperature can be controlled sufficiently and can be maintained within the desired range.

Here again the unorthodox handling of the apparatus results in a substantial process engineering advantage. The pulverization can be controlled as correspondingly via the sieve and the speed of rotation.

Depending on how thick-flowing the corresponding honey is fed in, lumps and pieces baked together are generated immediately upon feeding in of the honey. These are unimportant. The quantity proportions in the above recited range are predetermined. The honey is introduced in portions into the working mixer filled with silica. The resistance to motion, increasing based on lump formation, results in increased friction and in a slight heat generation. This is sufficient to dissolve up to the end of the mixing in an increasing amount the lumps generated and the pieces baked together. Advantageously, the honey is introduced at a temperature in the range of from 20 to 25 degrees centigrade. In the course of the mixing process, the temperature is slightly increased to a value in the region of from 32 to 35 degrees centigrade. In the case of an addition in portions of the honey, there are present clearly separated honey lumps in the silica during the initial phase. The lump formation can increase during the addition of the first third of the honey. However, then a homogeneous mixture is obtained upon further honey addition, and finally a dried powder is produced.

According to one embodiment of the invention, the silica is filled in, depending on the desired parts in the final product, in amounts of from 15 to 25 parts, and then the honey or the honey product is added in portions. The addition can also be provided continuously. During the addition, one does not note at all the initially generated lumps. The addition is provided only such that either the honey is introduced if possible into the middle of the material or, if the honey is introduced in an arbitrary fashion, then scrapers or strippers are provided at the walls of the container, which guide the honey back into the material. This way of running the process is preferred. It is not required according to the invention process to introduce heated honey or heated honey products into the silica. It is decisive that the stirring process at the stirrer is performed with a high torsion force such that the conglomerates providing resistance can be dissolved by their own friction heat. For this purpose, a short term overheating of the motor has to be accepted or a change in the power of the motor of the stirring apparatus has to be done.

According to a further embodiment of the invention, the silica is mixed with the carbohydrates and then honey is added to this mixture as described above. In addition, the silica and the carbohydrates can be mixed separately in a premixer and then the mixture as described above can be mixed with honey. According to a further embodiment, initially a mixture of honey and carbohydrates is produced by mixing the carbohydrates and the honey in such a way that a powdery mixture is still obtained. Powdered mixtures are obtained if the content in honey amounts to at most 55 percent by weight as referred to the mixture of honey and carbohydrates. Then silica is added to the mixture of honey and carbohydrates, mixing is provided, and the remainder of the honey is added.

It is a further advantage of the invention process that the mixing step is finished in a surprisingly short time. In general, the mixing requires a time of only a few minutes to up to at most a quarter of an hour.

The material obtained according to the invention process has a temperature in the range from 25 to 32 degrees centigrade and can be packaged immediately and furnished to its end use. Comminuting the material afterwards or providing for an intermediate storage is not required. Also, no volume changes occur during storage.

The obtained particle size, which ranges from fine ground to coarse-grained, is determined by the viscosity of the honey fed in. The viscosity of the honey can be influenced either via the temperature or via the frictional forces during mixing. A higher temperature or a more intensive mixing result in finer end particles. If honey is employed at temperatures from 15 to 25 degrees, then with increasing temperature a more fine material is obtained.

Fine material also is obtained in the range of 400 to 5000 rpm and a somewhat longer mixing time. The size of the particles of the final product can thus be set by simple means, and every suitable grain size between flour type and fine granulate can be obtained.

Honey with high parts in glucose, which generally crystallizes easily, is preferably employed in the invention method. Crystallization is absolutely undesired for the sale of honey based on the solidity and on the tendency to separate into phases. However, if in the invention method honey with a large part in glucose is employed, then the formation of powder is made more simple. According to general views, honey types with strong crystallization are unsuitable and questionable for commercial sales. (Compare for example Enoch Zander, Anna Maurizio "The Honey", 2nd edition, 1974, Publisher: Verlag Eugen Ulmer, Stuttgart and Roy A. Grout, "The Hive and the Honey Bee", 5. edition, 1963, Standard Printing Company, Dadant and Sons, Hamilton, Ill., United States). However, such a honey unsuitable for selling is particularly advantageous for the invention method. The glucose part of the honey ranges in such products at about 40 percent, preferably at more than 50 percent and more preferred are even higher values.

The honey or glucose rich honey employed according to the invention method can contain in addition further bee products. Honey, including the glucose rich honey, can comprise for example beebread, and/or flower pollen and/or blossom pollen, royal jelly (Gelee Royale), drone larval syrup, dispersed beeswax, propolis extract and/or propolis. However, the honey does not contain more than 50 weight percent of another bee product, preferably 40 percent and more preferred 15 weight percent other bee product or mixture of bee products as referred to the weight of the honey. The parts in the various bee products can be as follows:

Beebread and/or flower pollen and/or blossom pollen up to 50 percent by weight and preferably 20 to 30 percent by weight, Royal jelly (Gelee Royale) and/or drone larval syrup up to 15 percent by weight, preferably from 5 to 10 percent by weight, dispersed beeswax and/or propolis extract up to 10 percent by weight, preferably 2 to 8 percent by weight, and propolis (bee glue) up to 2 percent by weight, preferably 1 percent by weight.

According to a further embodiment of the invention, polymeric hydrocarbons are added to the product of honey and silica. Carbohydrates are employed as such polymeric carbohydrates, which either act as ballast materials or which are in themselves of food quality. Preferably celluloses are employed. Alpha-cellulose is particularly preferred among the celluloses, since it is industrially available. Preferred carbohydrates are extruded or expanded grain products or micronized grain products, which are commercially available such as for example swell-starch flour, extruded starch precursors for the food industry, for example such materials from wheat, corn, rice, millet and maltodextrins. Such polymeric carbohydrates are known to the person skilled in the art.

Final products are obtained according to the invention process, which contain honey and silica or respectively honey, silica and polymeric carbohydrates.

The products from silica and honey contain 75 to 85 percent by weight and preferably 80 percent by weight honey;

25 to 15 percent by weight and preferably 20 percent by weight silica, as referred to the final product.

The products from honey, silica and polymeric carbohydrates contain 5 to 15 percent by weight and preferably 5 to 10 percent by weight silica, 25 to 35 percent by weight and preferably 25 to 30 percent by weight polymeric carbohydrates, and 50 to 70 percent by weight and preferably 60 to 70 percent by weight of honey.

Particularly preferred invention products contain 20 percent by weight silica and 80 percent by weight carbohydrates. A further preferred invention product contains 66 percent by weight honey, 28 percent by weight polymeric carbohydrates and 6 percent by weight of silica. The percentages in each case refer to the final product.

The final product can contain further additives in addition to the components indicated. The additives are employed in quantities of at most 5 weight percent. This means, that with respect to 95 weight percent of final product obtained, at most 5 percent by weight of additives are added. Such materials can be employed as additives which provide active ingredient complementation such as, for example, enzymes, hormones, vitamins, mineral materials (Ca-K-Na-Mg-P-S), and trace elements of any kind, coloring agents, flavoring agents and other materials with special effects, for example, plant extracts.

As desired, the additives can be mixed into the silica, the mixture of silica and carbohydrates, the honey, the mixture of honey and cellulose or the cellulose, or one can also add the additives to the final product obtained.

It was surprising and not obvious that powdered honey products can be produced with such a low content in silica. It was further surprising that silica, polymeric carbohydrates and honey can be processed to a powdered mixture, since honey in physical admixture with alpha-cellulose by itself usually leads immediately to a viscid-adhesive strong lump formation.

It is possible according to the invention to substitute part of the silica with ballast materials of organic origin, that is polymeric carbohydrates, alpha-cellulose and similar materials.

The particular and surprising effect is that therewith the content in organic materials of the mixture can be increased to 90 to 95 percent by weight and the content in inorganic silica can be reduced drastically to 10 to 5 percent by weight without missing the goal of obtaining a powdered product which can be handled and which is pourable.

The powdered honey product provided according to the present invention shows in summary the following improvements:

In comparison with the conventionally known mixing process (Degussa) which starts with proportions of 50 to 75 percent by weight of flowing product to 50 to 25 percent by weight silica, the proportion of 75 to 85 percent by weight of flowing bee product as honey or as a honey mixture relative to 25 to 15 percent by weight of silica is reached. The silica part required for the powder formation can therefore be reduced drastically by a factor range of 0.6 to 0.5 and in fact is halved, which indicates a tremendous decrease since thereby the technically introduced part in mineral or ash is decreased such that it is not a hindrance any longer for practical applications.

If according to the method other suitable organic materials are introduced such as carbohydrates, polymeric sugars or cellulose, this then results in a further drastic decrease of the part in silica into the range of from 15 to 5 percent by weight of the final product. This factor range is at 0.3 to 0.1 as compared with the model (Degussa), that is only one third to one tenth of the amount of silica required up to now. Thereby the content in minerals or ash in the final product is reduced such that it is in the region of the ash contents of animal or plant products, such as for example of whey powder (animal) or of grain.

The invention method provides additional essential advantages:

1. It is possible to manufacture powdered honey products with a honey component of more than 50 percent by weight, and preferably 75 to 80 percent by weight in the final product.

2. The manufacture of the products is performed rapidly, in a safe way and is connected with low time consumption and little equipment requirement.

3. In the invention method, maximum temperatures of 35 degrees centigrade occur and this does not affect the vital components of the honey, that is they remain preserved.

4. No danger exists in the invention process of contamination of the final products by germs.

5. The final products obtained have a clear light color based on the silica component, and this color is practically equivalent to that of crystal sugar. The sweetening effect of the product also approximately equals that of sugar based on the strong sweetening properties of the fructose. If the final product contains parts of about 5 percent pollen from blossoms and flowers, then it is colored thereby yellow such that the color hue corresponds practically to that of honey. Thus the final products can also be made optically to resemble sugar or honey as desired.

Based on their powder form, the invention products can be extremely easily handled and stored in households and in the processing industry. They thereby open up to bee products and in particular honey a broad, new palette of applications and possibilities of use.

The powdered products can be employed as easily transportable, easily metered and mixable intermediate products in foods of all kinds. They can be employed as parts in baking doughs and batters, television dinners, dry food, and the like, as means for enriching desserts, fillings and stuffings, creams, ice cream, pastes, and fruit preparations, as carrier materials for vitamins, pharmaceutical agents, spices, mineral materials, and the like, as basic material for tablets, pellets, pills and the like.

Honey can only with difficulty be processed in the food industry, for example in desserts, fillings, creams and the like, since honey is heavy and deposits immediately. It has therefore to be transformed in a finely distributed state by intensive mixing and stirring if possible at an increased temperature. Strong stirring is frequently damaging to the food stuffs into which the honey is to be introduced such as for example yoghurts, puddings, and the like, since thereby the structure is broken. Such difficulties do not occur with the powder product according to the present invention.

For example, it is also possible to produce, based on the powdered final products under admixture of milk protein and fat concentrates and vitamins and mineral materials, good tasting dry rations for sports, competitive sports, such as, for example, in the shape of bars for hikers, for national marchers, for cross-country racers, or as pouch beverages for cyclists and so on, or for diets for sick people and the like.

The invention product can also be employed as a sugar substitute in the place of sugar.

The following examples illustrate the invention.

EXAMPLE 1a

Manufacture of a Powdered Bee Product with a Content in Honey of 75 percent by weight 25 kilograms of silica are weighed and are fed to a mixer.

75 kilograms of honey at a temperature of from 23 to 25 degrees centigrade are transferred with a pump to a mixer, which contains the silica and which is operating such that in each case 1/6 of the amount (12.5 kg) runs in. It is then necessary to wait for a short time until the lumps have dissolved and then further honey is added.

After a mixing time of from about 3 to 5 minutes the material to be mixed has a sufficient homogeneity. The temperature of the material to be mixed is about 30 to 32 degrees centigrade. The mixed material is withdrawn immediately and packaged in individual packages and is ready for sale to the final user. The composition of the product obtained is contained in the following table I.

TABLE I

Composition of the Final Products Obtained According to Examples 1 and 2.

| Example | % Silica (Ash) | % Carbohydrates (Ballast) | % Honey (mixture) |
| --- | --- | --- | --- |
| 1 | 25 | — | 75 |
| 2 | 10 | 30 | 60 |

EXAMPLE 1b

One operates as described in Example 1a, however instead of the pure honey a honey mixture is employed, which comprises 6% royal jelly (Gelee Royale) and drone larval syrup.

In the same manner as described in Example 1a, a powdered product is obtained, which is packaged and delivered to the final user.

EXAMPLE 2

Manufacture of a Powdered Product Containing 60 percent by weight of Honey and 30 percent by weight of Ballast Materials 30 kilograms ballast materials, in the present case alpha-cellulose, is placed in a mixing apparatus.

60 kilograms of honey are added in portions to the alpha-cellulose, which is moved in the mixer. The addition is provided such that in total 30 to 40 kilograms of the honey are added to the ballast materials. After dissolution of the lumps, a coarse-grained mass is generated.

10 kilograms of silica are added to the mixture of alpha-cellulose and honey and one obtains a free-flowing powdered mixture.

The balance of the honey of from 20 to 30 kilograms is pumped into a moving mixer. A fine grained mass is obtained after dissolution of the remaining lumps. The temperature of the mass has increased slightly, it is however below 35 degrees centigrade. The product is withdrawn and packaged.

Also a mill feed hopper can be employed instead of the mixer according to the above example. If a mill feed hopper is employed, then the alpha-cellulose is placed in the mill feed hopper and the honey is entered into the rotating mill with the feedback of the material.

The composition of the product is indicated in Table I.

EXAMPLE 3

Manufacture of a Final Product, which Comprises 63 percent by weight of Honey, 22 percent by weight of Glucose and 15 percent by weight of Silica 63 kilograms of honey are warmed to 25 degrees centigrade and then are worked into 22 kilograms of crystallized glucose under stirring. The glucose remains crystallized and is dispersed uniformly in the honey.

A mixing apparatus, preferably an emulsifying mixer, is fed with 15 kilograms of silica initially and then the mixer is started.

The honey glucose mixture is pumped via a pump in 6 portions of 6.3 kilograms each into the mixer moving the previously entered material. A fine-grained dry mass is produced after disolving of the initially produced conglomerates and the temperature at the end of the about 5 minute long mixing process is 30 to 35 degrees centigrade. The mass is removed and packaged and is delivered to the final user.

The composition of the product obtained is set forth in the following table II.

TABLE II

Composition of the Final Products Obtained in the two Examples 3 and 4

| Example | % Silica | % Honey with (Pollen) | % Water Final Moisture |
|---|---|---|---|
| 3 | 15 | 63 + 22 glucose | 13 |
| 4 | 6b | 64 (with 16% Pollen) | 14 (30 cellulose) |

EXAMPLE 4

Manufacture of a Powdered Final Product with 64 kg Pollen Honey, 30 kg Ballast Carbohydrate Employing Cellulose 48 kilograms of honey are warmed to 23 degrees centigrade, and 16 kilograms of pollen from flowers and/or blossoms are finely dispersed in the honey.

A hammer mill is fed in its input hopper with 15 kilograms of silica. A coarse sieve is entered, a small material feed is set, and then the hammer mill is set to operate. The exiting material is thereby returned to the feed hopper.

The mixture of honey and pollen is pumped via a line into the mill space and into the material stream running around there until all material is used up and the mixture is finished. The temperature is kept at 35 degrees centigrade by using the feed back at the same time as a means to provide cooling.

After termination, the finished product is removed at the output point for packaging. The manufacturing time is between 5 and 8 minutes.

The composition of the product obtained is given in Table II.

I claim:

1. A method for the preparation of a powdered honey product which contains at least 50 weight percent honey comprising the step of combining with agitation 5 to 25 weight percent pyrogenic or precipitated fine grained silica with 50 to 85 weight percent of a honey component which is honey or a mixture of honey and at least one bee product selected from the group consisting of beebread, pollen, royal jelly, drone syrup, queen syrup, beeswax, propolis and propolis extract at a temperature not exceeding 35° C., said percentages based on the final powdered honey product.

2. The method of claim 1 in which said silica and honey component are also combined with 25 to 35 weight percent polymeric carbohydrates, based on the weight of the final powdered honey product.

3. The method of claim 2 in which the silica and polymeric carbohydrates are first mixed and are then combined with the honey component.

4. The method of claim 2 in which about 45 to 55 weight parts of the honey component are first combined with about 45 to 55 weight parts of the polymeric carbohydrate, the silica is added to the resulting mixture and thereafter the remaining part of the honey component is combined with the resulting admixture.

5. The method of claim 2 in which the polymeric carbohydrate is alpha-cellulose or starch.

6. The method of claim 2 in which the silica, polymeric carbohydrate and honey component is at least 95 weight percent of the final powdered honey product.

7. The method of claim 1 in which the honey component is divided into a plurality of portions which are individually combined with the silica until all of the portions have been combined.

8. The method of claim 1 in which the honey component contains at least 40 weight percent glucose.

9. The method of claim 8 in which the honey component contains at least 50% glucose.

10. The method of claim 1 in which the mixture of honey and at least one bee product contains up to 50 weight percent beebread or pollen, up to 15 weight percent royal jelly or drone syrup, up to 10 weight percent beeswax or propolis extract and up to 2 weight percent propolis and wherein the honey is at least 50 weight percent of said mixture.

11. The method of claim 10 in which the honey component contains at least 60 percent honey.

12. The method of claim 11 in which the honey component contains at least 85% honey.

13. The method of claim 1 in which the silica and honey component is at least 95 weight percent of the final powdered honey product.

14. The method of claim 1 in which the amount of silica is 20 weight percent and the amount of honey component is 80 weight percent.

15. The method of claim 2 in which the amount of silica is 5–10 weight percent, the amount of polymeric carbohydrate is 20–30 weight percent and the amount of honey component is 60–70 weight percent.

16. The method of claim 15 wherein the amount of silica is 6 weight percent, the amount of polymeric carbohydrate is 28 weight percent and the amount of honey is 66 weight percent.

17. A powdered honey product containing 5 to 25 weight percent pyrogenic or percipitated fine grain silica and 50 to 85% of a honey component which is honey or a mixture of honey and at least one bee product selected from the group consisting of beebread, pollen, royal jelly, drone syrup, queen syrup, beeswax, propolis and propolis extract, in which the amount of honey is at least 50 weight percent.

18. The powdered honey product of claim 17 in which the amount of honey component is 80% and the amount of silica is 20%.

19. The powdered honey product of claim 17 additionally containing 25 to 35 weight percent polymeric carbohydrate.

20. The powdered honey product of claim 19 in which the amount of silica is 5–10%, the amount of polymeric carbohydrate is 25–30% and the amount of honey component is 60–70%.

21. The powdered honey product of claim 20 in which the amount of silica is 6%, the amount of polymeric carbohydrate is 28% and the amount of honey component is 66%.

22. The powdered honey product of claim 19 in which the polymeric carbohydrate is alpha-cellulose or starch.

23. The powdered honey product of claim 19 in which the honey component contains at least 40% glucose.

24. The powdered honey product of claim 17 in which the honey component contains at least 40% glucose.

* * * * *